(12) United States Patent
Oates et al.

(10) Patent No.: US 9,096,313 B2
(45) Date of Patent: Aug. 4, 2015

(54) HIGH FREQUENCY PULSED MICROJET ACTUATION

(75) Inventors: William S. Oates, Tallahassee, FL (US); Jonathan E. Clark, Tallahassee, FL (US); Farrukh S. Alvi, Tallahassee, FL (US)

(73) Assignee: The Florida State University Research Foundation, Inc., Tallahassee, FL (US)

( * ) Notice: Subject to any disclaimer, the term of this patent is extended or adjusted under 35 U.S.C. 154(b) by 908 days.

(21) Appl. No.: 13/069,872

(22) Filed: Mar. 23, 2011

(65) Prior Publication Data
US 2011/0232792 A1    Sep. 29, 2011

Related U.S. Application Data

(60) Provisional application No. 61/340,794, filed on Mar. 23, 2010.

(51) Int. Cl.
| | |
|---|---|
| *B64C 21/04* | (2006.01) |
| *B05B 1/00* | (2006.01) |
| *B05B 1/08* | (2006.01) |
| *B05B 17/06* | (2006.01) |
| *F15D 1/00* | (2006.01) |

(52) U.S. Cl.
CPC ............... *B64C 21/04* (2013.01); *F15D 1/008* (2013.01); *B05B 1/005* (2013.01); *B64C 2230/18* (2013.01); *Y02T 50/166* (2013.01)

(58) Field of Classification Search
CPC   B64C 21/04; B64C 2230/04; B64C 2230/06; B64C 2230/18; B05B 1/005; B05B 17/0607; F15D 1/008; Y02T 50/166; Y02T 1/168
USPC ............... 239/4, 102.1, 102.2, 589, 592–594, 239/602; 244/207; 417/413.1, 413.2
See application file for complete search history.

(56) References Cited

U.S. PATENT DOCUMENTS

| | | | |
|---|---|---|---|
| 5,758,823 A * | 6/1998 | Glezer et al. .................. | 239/4 |
| 2003/0075615 A1* | 4/2003 | Saddoughi ................ | 239/102.2 |
| 2008/0087771 A1* | 4/2008 | Boespflug et al. ............ | 244/207 |
| 2008/0238248 A1* | 10/2008 | Chrysler et al. .............. | 310/317 |
| 2009/0060750 A1* | 3/2009 | Chen et al. .................... | 417/26 |
| 2009/0219686 A1* | 9/2009 | Ishikawa et al. .............. | 361/692 |
| 2010/0044459 A1* | 2/2010 | Xu et al. .................... | 239/102.2 |
| 2010/0229952 A1* | 9/2010 | Smith et al. ...................... | 137/1 |

* cited by examiner

*Primary Examiner* — Darren W Gorman
(74) *Attorney, Agent, or Firm* — J. Wiley Horton

(57) ABSTRACT

An actuator configured to rapidly vary the throat geometry of a microjet nozzle. Varying the throat geometry rapidly changes the characteristics of the microjet produced by the microjet nozzle. The inventive device is capable of producing pulsed flow. In some embodiments it is also capable of producing rapidly variable flow in order to provide active control.

18 Claims, 3 Drawing Sheets

HIGH FREQUENCY PULSED MICROJET ACTUATION

CROSS-REFERENCES TO RELATED APPLICATIONS

This application is a non-provisional application claiming the benefit of an earlier-filed provisional application, pursuant to the provisions of 37 C.F.R. 1.53 (c). The provisional application was filed on Mar. 23, 2010. It listed the same inventors and was assigned application Ser. No. 61/340,794.

STATEMENT REGARDING FEDERALLY SPONSORED RESEARCH OR DEVELOPMENT

Not Applicable.

MICROFICHE APPENDIX

Not Applicable

BACKGROUND OF THE INVENTION

1. Field of the Invention

This invention relates to the field of flow control in a compressible fluid. More specifically, the invention comprises a piezoelectric actuator for varying the throat geometry of a microjet nozzle, thereby varying the characteristics of the microjet produced by the microjet nozzle.

2. Description of the Related Art

Microjet nozzles are reduced-scale conventional nozzles configured to produce small jets of fast moving compressible fluid ("microjets"). Air is the most commonly used fluid. Microjets can be employed to modify air flowing over a surface and have many applications, such as modifying flow over aircraft lift and control surfaces.

Microjets can be subsonic, transonic, or supersonic. FIG. 1 shows a simple nozzle configured to create a supersonic microjet. Microjet nozzle 10 is a passage bounded by a revolved wall profile. While microjets need not always have a circular cross section, this is generally the cross section employed. In order to create a supersonic microjet, incoming flow 12 is directed through converging section 14, throat 22, and diverging section 16. Those skilled in the art will know that the converging section accelerates the flow in its subsonic phase. The flow will be transonic through the region of throat 22. The flow will then become supersonic and accelerate further as it passes through diverging section 16. Microjet 20 is then formed as the flow passes out of nozzle exit 18.

The throat diameter of a microjet nozzle will typically lie between about 100 micrometers and about 1000 micrometers. The pressure ratio between the microjet produced and the surrounding atmosphere will typically lie between about 1.01 and about 50. Some examples may lie outside these ranges.

It is known to vary the characteristics of the microjet by varying the input pressure. This will alter the velocity of the gas flowing through the microjet nozzle. Unfortunately, though, varying the input pressure will not rapidly alter the flow. One of the applications for microjets is active boundary layer control. This application would benefit from the ability to rapidly alter the microjet's characteristics. A pressure variation frequency of 100 Hz to 10 kHz would be beneficial in many applications. There are presently pulsed mass flow actuators that are capable of achieving frequencies in the low kHz regime. However, these actuators are limited to a narrow range of frequencies. It is preferable to provide a microjet nozzle/actuator combination which can achieve high cyclic rates while retaining the ability to operate across a wide range of frequencies. The present invention proposes an actuator which can produce such rapid cycling.

BRIEF SUMMARY OF THE INVENTION

The present invention is an actuator configured to rapidly vary the throat geometry of a microjet nozzle. Varying the throat geometry rapidly changes the characteristics of the microjet produced by the microjet nozzle. The inventive device is capable of producing pulsed flow. In some embodiments it is also capable of producing rapidly variable flow in order to provide active control.

Figure 1:
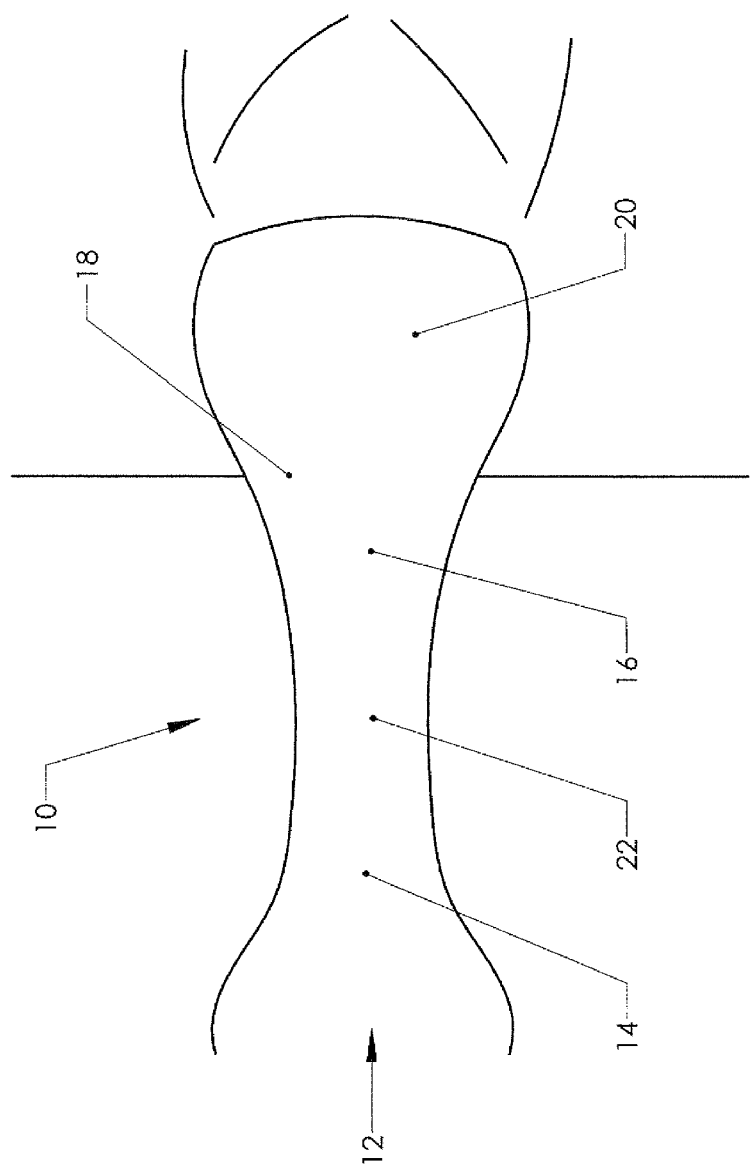
FIG. 1 is a view of a prior art nozzle configured to create a supersonic microjet.

| REFERENCE NUMERALS IN THE DRAWINGS | | | |
|---|---|---|---|
| 10 | microjet nozzle | 12 | incoming flow |
| 14 | converging section | 16 | diverging section |
| 18 | nozzle exit | 20 | microjet |
| 22 | throat | 24 | actuator assembly |
| 26 | piezoelectric stack actuator | 28 | piston |
| 30 | piston diaphragm | 32 | hydraulic chamber |
| 34 | nozzle diaphragm | 36 | needle |
| 38 | needle channel | 40 | bulge |
| 42 | relieved volume | | |

DETAILED DESCRIPTION OF THE INVENTION support→What are cyclical characteristics. Cycle rate of 5 hz to 5 khz; altering cross section of throat; said at least a portion of said nozzle wall is thinner than a surrounding portion of said nozzle wall Those skilled in the art will know that varying the cross sectional area of a nozzle such as shown in FIG. 1 will vary the characteristics of the microjet produced by the nozzle. In large scale deviations, such as those used in SCRAM-jet nozzles, the geometry is varied using movable ramp surfaces. This is also true for the variable intake geometry used in turbojet engines mounted in supersonic aircraft. These variable geometry systems employ relatively complex hydraulic actuators.

Such actuation devices are impractical for objects constructed on the scale of a microjet nozzle. An exemplary throat diameter of a nozzle such as shown at FIG. 1 is about 300 micrometers. Those skilled in the art will readily appreciate the fact that movable surfaces and other known large-scale devices are impractical on such a small scale.

Figure 2:
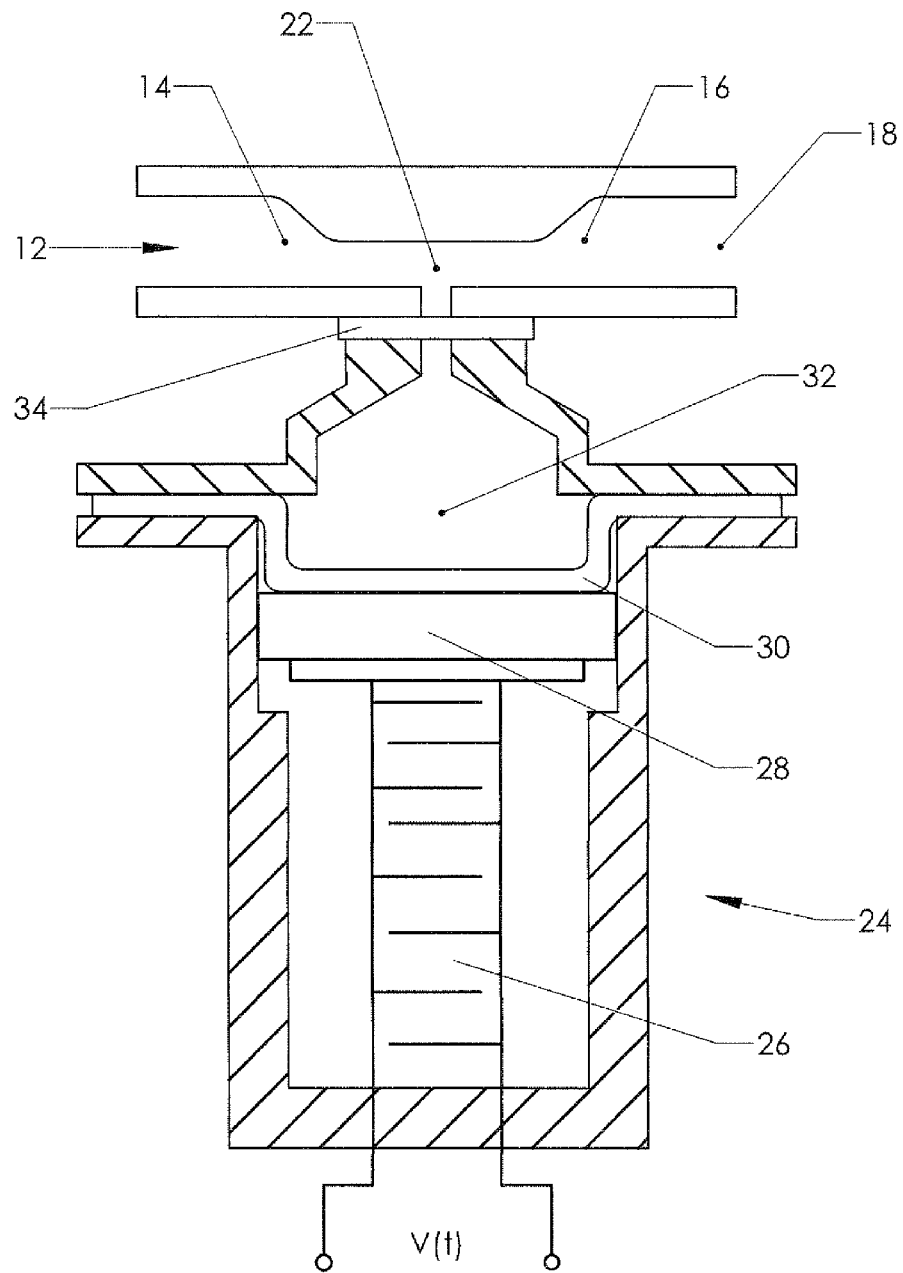
FIG. 2 is a sectional elevation view, showing one embodiment of a piezoelectric actuator configured to alter the geometry of a microjet nozzle.

FIG. 2 shows a sectional elevation view of a device which is suitable for such a small-scale application. Actuator assembly 24 contains a piezoelectric stack actuator 26. This type of actuator expands very rapidly in response to an applied voltage (shown as V(t)). By stacking piezoelectric actuators which are wired in parallel, the motion produced can be increased while maintaining essentially the same response time.

One end of piezoelectric stack actuator 26 is fixed to a housing. The opposite end is connected to piston 28. Piston 28 pushes against piston diaphragm 30, which seals hydraulic fluid inside of hydraulic chamber 32. The opposite end of the hydraulic chamber is sealed by nozzle diaphragm 34. Thus, when a voltage is applied to the device, piston 28 is forced upward. This increases the pressure in the hydraulic chamber and causes a portion of nozzle diaphragm 34 to deflect upwards into throat 22 of the attached microjet nozzle.

Piezoelectric actuators are very responsive. They can convert variable voltage input into variable motion at relatively high frequencies (such as 1 kHz). The rest of the actuator mechanism described is also able to respond at such high frequencies. Thus, the actuator shown in FIG. 2 is capable of rapidly varying the throat area of the microjet nozzle shown at FIG. 2.

Figure 3:
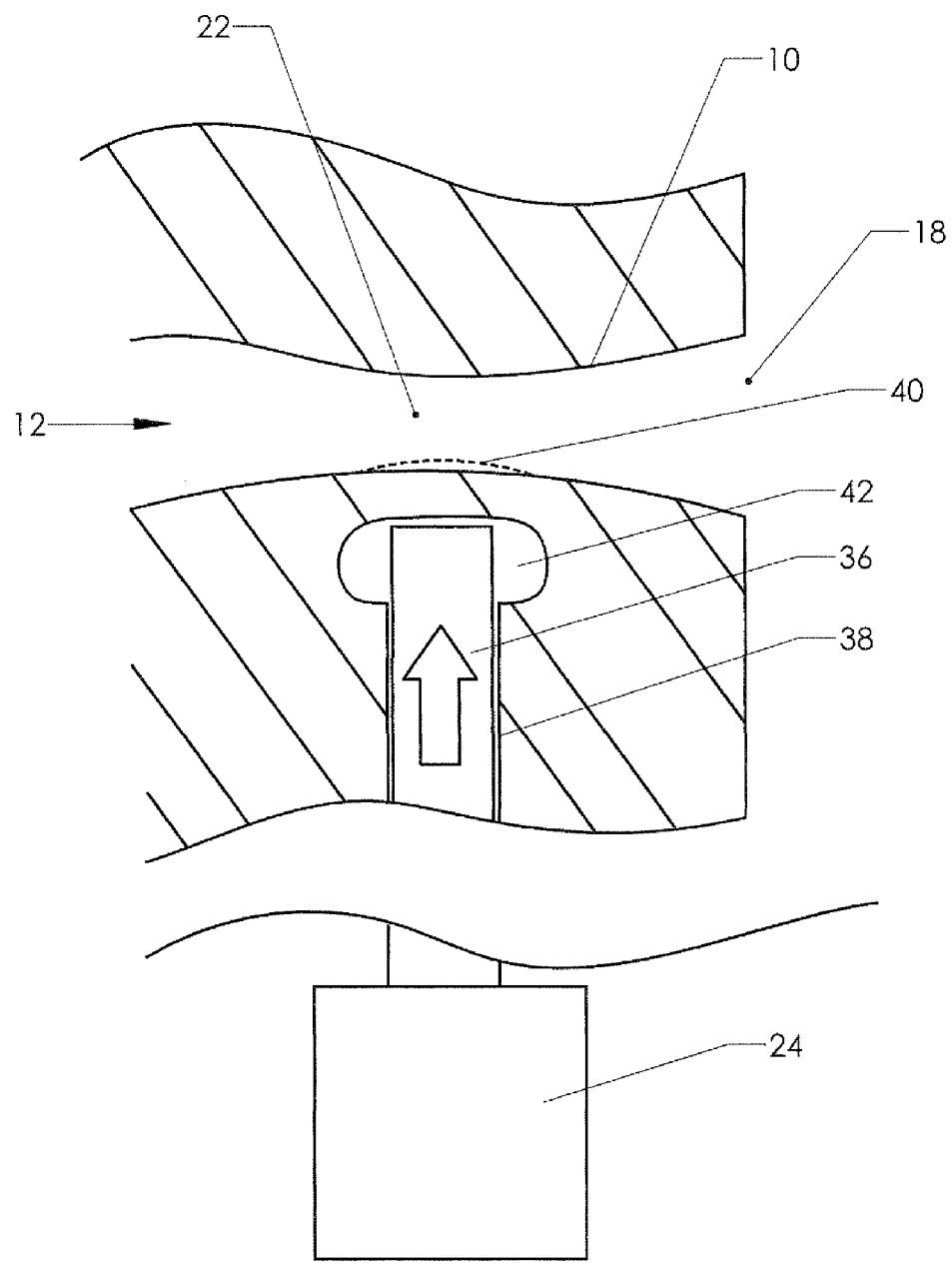
FIG. 3 is a sectional elevation view, showing a second embodiment of a piezoelectric actuator configured to alter the geometry of a microjet nozzle.

The device illustrated in FIG. 2 is properly viewed as one exemplary embodiment out of many possibilities. FIG. 3 illustrates a second embodiment which is somewhat simpler to construct. Because of its relative simplicity, the embodiment of FIG. 3 is the preferred embodiment.

In FIG. 3, a variable microjet nozzle 10 is created by providing a variable bore through a relatively elastic material. Incoming flow 12 passes through throat 22 and ultimately out nozzle exit 18. A needle channel 38 is provided through the material surrounding the microjet nozzle. This channel terminates near the nozzle wall, preferably in the vicinity of throat 22. A movable needle 36 is placed in the needle channel. The needle is contained by the needle channel, but is free to move up and down with respect to the orientation shown in the view. The upper portion of the needle is preferably provided with a flat surface which can bear against the nozzle wall and force it upward to form bulge 40. Relieved volume 42 is preferably provided proximate the termination of the needle channel so that the nozzle wall will be unreinforced in this region and will therefore more easily deflect.

The motion of needle 36 is provided by actuator assembly 24. The actuator assembly contains any motion-creating mechanism that is responsive enough to provide the rapid motion desired. One example is a piezoelectric stack actuator such as shown in FIG. 2.

In the embodiment of FIG. 3, a controller actuates actuator assembly 24, which pushes needle 36 into the adjacent nozzle wall. This deflects the nozzle wall inward to create bulge 40. When the actuator is turned off, the elastic properties of the nozzle wall itself are preferably used to return it to an undeflected state.

Of course, a return spring or even a reverse actuator can be used if desired. In the case of a reverse actuator, a piezoelectric stack acting in the opposite direction could be used to more rapidly restore the throat geometry to its undeflected state. In such case the needle would preferably be attached to the wall using a cross pin or other suitable mechanical feature. The use of a reverse actuator may allow the generation of higher frequencies in some materials.

The proposed actuator can be incorporated into a wide variety of known flow control systems. Because it is so responsive in the frequency domain, an active control system (using feed-back and/or feed-forward control loops) can be used. As one example, a computer can receive inputs from one or more pressure transducers located downstream of the microjet nozzle no which the actuator is attached. When the computer detects a particular condition, it can initiate a pulsed flow having a desired frequency. The control system can even vary the frequency in real time in order to disrupt unwanted isolations in the flow.

Those skilled in the art will readily appreciate that changing the cross-sectional area of the nozzle throat will alter the velocity of the gas (as well as other characteristics) as it exits the nozzle. The Mach number for any points x and y within the nozzle are related to the cross sectional area at those points. The relationship is given by the familiar expression:

$$\frac{A_y}{A_x} = \frac{M_x}{M_y} \sqrt{\left\{\frac{1+[(k-1)/2]M_y^2}{1+[(k-1)/2]M_x^2}\right\}^{(k+1)/(k-1)}},$$

where $k=c_p/c_v$ (the ratio of the specific heat at a constant pressure and the specific heat at constant volume).

One may readily perceive from this expression that changing the area at the throat will change the area ratio for every point downstream and thereby alter the Mach number at every point downstream. Under the principles of the ideal gas law, changing the Mach number will change the pressure and temperature of every point downstream. Thus, using the actuator to alter the throat geometry results in a change in velocity, temperature, and pressure of the flow exiting the nozzle.

As described previously, the use of the preferred piezoelectric actuator allows a very rapid cycling of the throat geometry. Depending upon the nozzle material and actuator geometry, oscillations as rapid as 5 kHz are possible. It is in theory possible to produce even higher frequency oscillations, but there is ultimately a limit in the ability of the fluid flow to respond. The low end of the frequency range is easier to achieve, though oscillations below 5 Hz are unlikely to produce useful effects.

The material selected for the nozzle wall is significant in embodiments such as shown in FIG. 3. The material must be flexible enough to elastically deform under the influence of the actuator. The material must also be fatigue resistant since it will likely experience significant periods of rapid oscillation. The reader should bear in mind that the microjet nozzle may at times be operated conventionally (without cyclical flow). The material must be able to perform well under these conditions. The material is preferably also able to withstand a wide range of cycling frequencies.

While a description of the potential applications for the inventive device is beyond the scope of this disclosure, those skilled in the art will realize that many known applications exist. These include the fields of boundary layer flow control and noise abatement.

The foregoing description and drawings comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Many modifications and other embodiments of the invention will come to mind to one skilled in the art to which this invention pertains having the benefit of the teachings presented in the foregoing descriptions and the associated drawings. Accordingly, the present invention is not limited to the specific embodiments illustrated herein, but is limited only by the claims.

Having described our invention, we claim:

1. A microjet nozzle assembly for creating a microjet with cyclical characteristics comprising:

a. a nozzle having a converging section, a throat, and a diverging section;
b. said throat having a diameter between 100 micrometers and 1000 micrometers;
c. said nozzle being configured to accelerate a flow of compressible gas to a supersonic velocity and direct said supersonic gas out said diverging section, thereby creating said microjet;
d. said nozzle being bounded by nozzle wall;
e. an actuator positioned to bear against at least a portion of said nozzle wall in said throat;
f. said actuator being configured to move said at least a portion of said nozzle wall inward, thereby altering a cross section of said throat and thereby altering said flow of said compressible gas through said nozzle; and
g. wherein said actuator is configured to cycle at a rate between about 5 Hz and about 5 kHz.

2. A microjet nozzle assembly as recited in claim 1, wherein said actuator is a piezoelectric actuator.

3. A microjet nozzle assembly as recited in claim 2, wherein said piezoelectric actuator includes a stack of at least two piezoelectric actuators electrically connected in parallel.

4. A microjet nozzle assembly as recited in claim 1, wherein said at least a portion of said nozzle wall is thinner than a surrounding portion of said nozzle wall so that said at least a portion of said nozzle wall elastically deforms under the influence of said actuator.

5. A microjet nozzle assembly as recited in claim 2, wherein said piezoelectric actuator is connected to said at least a portion of said wall by a moving needle.

6. A microjet nozzle assembly as recited in claim 3, wherein said piezoelectric actuator is connected to said at least a portion of said wall by a moving needle.

7. A microjet nozzle assembly for creating a microjet with cyclical characteristics, comprising:
a. a nozzle having a converging section, a throat, and a diverging section;
b. said throat having a diameter between 100 micrometers and 1000 micrometers;
c. said nozzle being configured to accelerate a flow of compressible gas to a supersonic velocity and direct said supersonic gas out said diverging section, thereby creating said microjet;
d. said nozzle being bounded by a nozzle wall;
e. an actuator configured to cycle between a non-actuated state and an actuated state;
f. said actuator being connected to at least a portion of said nozzle wall so that said cycling of said actuator between said non-actuated and said actuated states alters a cross section of said at least a portion of said nozzle wall and thereby alters said flow of said compressible gas through said throat; and
g. wherein said actuator is configured to cycle into and out of said actuated state at a rate between about 5 Hz and about 5 kHz.

8. A microjet nozzle assembly as recited in claim 7, wherein said actuator is a piezoelectric actuator.

9. A microjet nozzle assembly as recited in claim 8, wherein said piezoelectric actuator includes a stack of at least two piezoelectric actuators electrically connected in parallel.

10. A microjet nozzle assembly as recited in claim 7, wherein said at least at portion of said nozzle wall is thinner than a surrounding portion of said nozzle wall so that said at least a portion of said nozzle wall elastically deforms under the influence of said actuator.

11. A microjet nozzle assembly as recited in claim 8, wherein said piezoelectric actuator is connected to said at least a portion of said will by a moving needle.

12. A microjet nozzle assembly as recited in claim 10, wherein said actuator is a piezoelectric actuator that is connected to said at least a portion of said wall by a moving needle.

13. A microjet nozzle for creating a microjet with cyclical characteristics comprising:
a. a nozzle having a converging section, a diverging section, and a throat therebetween;
b. said throat having a diameter between 100 micrometers and 1000 micrometers;
c. said nozzle being configured to accelerate a compressible gas to a supersonic velocity and direct said supersonic gas out said diverging section, thereby creating said microjet;
d. said nozzle being bounded by a nozzle wall;
e. an actuator configured to cycle between a non-actuated state and an actuated state;
f. said actuator being connected to at least a portion of said nozzle wall so that said cycling of said actuator between said non-actuated and said actuated states alters a cross section of said at least a portion of said nozzle wall; and
g. wherein said actuator is configured to cycle into and out of said actuated state at a rate between about 5 Hz and about 5 kHz.

14. A microjet nozzle assembly as recited in claim 13, wherein said actuator is a piezoelectric actuator.

15. A microjet nozzle assembly as recited in claim 14, wherein said piezoelectric actuator includes a stack of at least two piezoelectric actuators electrically connected in parallel.

16. A microjet nozzle assembly as recited in claim 13, wherein said at least a portion of said nozzle wall is thinner than a surrounding portion of said nozzle wall so that said at least a portion of said nozzle wall elastically deforms under the influence of said actuator.

17. A microjet nozzle assembly as recited in claim 14, wherein said piezoelectric actuator is connected to said at least a portion of said wall by a moving needle.

18. A microjet nozzle assembly as recited in claim 16, wherein said actuator is a piezoelectric actuator is connected to said at least a portion of said wall by a moving needle.

* * * * *